United States Patent [19]

Ishikawa

[11] Patent Number: 4,482,976
[45] Date of Patent: Nov. 13, 1984

[54] VOICE DATA OUTPUT APPARATUS FOR ELECTRONIC CASH REGISTERS

[75] Inventor: Hiroyuki Ishikawa, Tokyo, Japan

[73] Assignee: Casio Computer Co., Ltd., Tokyo, Japan

[21] Appl. No.: 545,594

[22] Filed: Oct. 26, 1983

Related U.S. Application Data

[63] Continuation of Ser. No. 258,949, Apr. 30, 1981, abandoned.

[30] Foreign Application Priority Data

May 8, 1980 [JP] Japan .................................. 55-61138

[51] Int. Cl.³ ............................. G06F 3/16; G10L 1/00
[52] U.S. Cl. ..................................... 364/710; 364/405
[58] Field of Search ............... 364/405, 404, 710, 900; 381/51

[56] References Cited

U.S. PATENT DOCUMENTS

| | | | |
|---|---|---|---|
| 4,060,848 | 11/1977 | Hyatt | 364/405 |
| 4,185,169 | 1/1980 | Tanimoto et al. | 381/51 |
| 4,276,444 | 6/1981 | Tanimoto et al. | 381/51 |
| 4,282,404 | 8/1981 | Tanimoto et al. | 381/51 |
| 4,348,551 | 9/1982 | Nakatani et al. | 364/405 |
| 4,366,873 | 1/1983 | Levy et al. | 364/710 |
| 4,369,334 | 1/1983 | Nakatani et al. | 364/405 |

Primary Examiner—David H. Malzahn
Attorney, Agent, or Firm—Frishauf, Holtz, Goodman & Woodward

[57] ABSTRACT

A voice data output apparatus for an electronic cash register comprises in turn a voice output circuit which in turn judges as to whether or not the input money data is a first registered number and which outputs a greeting voice, e.g., "WELCOME" when it is in fact the first registered number. A CPU is connected to an input circuit, a print circuit, a display circuit, a RAM and the voice output circuit through chip designating signal lines, an R/W signal line, an address bus line, and a data bus line. Chip designating signals are supplied from the CPU to the above-mentioned respective circuits for selecting a circuit to be used among these circuits. The display circuit and the voice output circuit are selected by the same chip designating signal. When a first registered number of the money data is input from the input circuit, the voice output circuit outputs a voice "WELCOME" according to the data "1" stored in a flag storing region of the CPU of this circuit, and thereafter rewrites the content of the flag storing region to "0". When a CASH/MONEY RECEIVED KEY of the input section of the input circuit is operated, the content of the flag storing region is rewritten to "1" for waiting for input of the money data for a next customer.

4 Claims, 9 Drawing Figures

VOICE DATA OUTPUT APPARATUS FOR ELECTRONIC CASH REGISTERS

BACKGROUND OF THE INVENTION

The present invention relates to an electronic device having a voice output function and, more particularly, to a voice data output apparatus for an electronic cash register which outputs a predetermined voice when it has judged a first registered number of numerical data input from an input section.

Electronic cash registers have recently become multifunctional, and electronic cash registers having voice output function are known which are capable of outputting, with a voice, money data input by money keys.

With a conventional electronic cash register having a voice output function in a store, as one of the customer services, the operator offers a greeting to the customer, e.g., "WELCOME", before operating the money keys of the cash register. Since this greeting must be performed for every customer, this has placed a big work load on the operator. Furthermore, the operator may accordingly forget to greet the customer. Depending upon the physical and mental condition of the operator, the greeting may sound unpleasant to the customer.

An electronic cash register has thus been desired which is capable of consistently offering a pleasant greeting to the customer regardless of the condition or carelessness of the operator.

It is, therefore, the object of the present invention to provide a voice data output apparatus which is capable of outputting a predetermined voice when it has judged a first registered number of numerical data output from an input section.

SUMMARY OF THE INVENTION

In order to achieve this object, the present invention provides a voice data output apparatus for an electronic cash register comprising input means having at least registering keys for inputting numerical data for supplying input signals obtained by operation of said keys; control means connected to said input means for performing predetermied operations according to said input signals from said input means and for supplying data and control signals; visual information output means connected to said control means for outputting, according to the data and control signals supplied from said control means, visual information corresponding to said data; and voice outputting means connected to said control means for outputting, according to the data and control signals supplied from said control means, a voice corresponding to said data and for outputting a predetermined voice when said data is a first registered number of said numerical data.

A voice data output apparatus of the present invention is of the construction according to which a predetermined voice is output upon judging a first registered number of numerical data input by the registering keys. When the present invention is applied to an electronic cash register, a greeting to the customer is performed when the operator registers the most significant digit of money data, that is, the first number, during input of the money data for a particular customer with the money keys of the electronic cash register. Greetings can thus be given at appropriate timings. With this cash register, the operator need not greet the customer before inputting the money data, thus decreasing the work load of the operator. Since the greeting voice is output from the cash register, the problems with the prior art cash registers are eliminated (the operator forgetting to greet the customer or the operator giving an unpleasant greeting due to physical or mental condition). Therefore, customers are always greeted with pleasant greetings.

DETAILED DESCRIPTION

Figure 1:
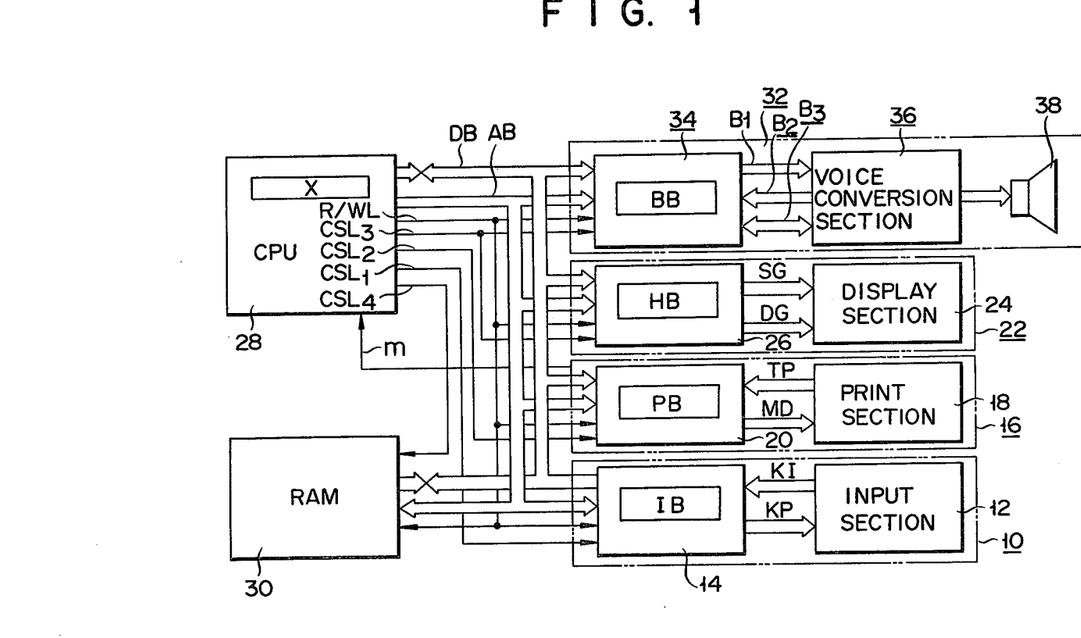
FIG. 1 is a block diagram illustrating the construction of an embodiment of a voice data output apparatus according to the present invention as applied to an electronic cash register.

Referring to FIG. 1, an input circuit 10 comprises an input section 12 and an input control section 14 connected to the input section 12.

The input section 12 has, in addition to keys such as money (numerical) keys, department keys, and a sub-total key, mode switches for setting the respective modes of "registering (REG)", "returning (RET)", "setting (SET)", "checking (X)" and "settling (Z)". A sampling timing signal KP is supplied from the input control section 14 to the input section 12. When one of the above-mentioned keys is operated, the information from the operated key is sampled by this timing signal KP. The sampled signal is supplied as a key input signal Kl to the input control section 14 to be stored in an input buffer IB of the input control section 14.

A print circuit 16 comprises a print section 18 and a print control section 20 connected to the print section 18.

The print section 18 has a printing drum (not shown) and supplies a printing position signal TP to the print control section 20. The print control section 20 has a print buffer PB and supplies to the print section 18 a printing signal MD generated on the basis of the data stored in the buffer PB and the print position signal TP, whereupon the money data and so on are printed on a journal paper sheet or a receipt paper sheet by the printing drum.

A display circuit 22 comprises a display section 24 and a display control section 26 connected to the display section 24.

The display control section 26 has a display buffer HB and supplies to the display section 24 a digit signal DG and a segment signal SG obtained by decoding the data stored in the display buffer HB. The display section 24 displays the money data and so on based on both these signals.

The input control section 14, the print control section 20, and the display control section 26 are connected to a CPU 28 and a RAM 30 through an address bus line AB, a data bus line DB, and a R/W signal line R/WL. The input control section 14 is connected to the CPU 28 through a chip designating signal line CSL1, and a chip designating signal CS1 is supplied to the input control section 14 therethrough. The print control section 20 is connected to the CPU 28 through a chip designating signal line CSL2 and is supplied with a chip designating signal CS2 therethrough. The display control section 26 is connected to the CPU 28 through a chip designating signal line CSL3 and is supplied with a chip designating signal CS3 therethrough.

The RAM 30 is connected to the CPU 28 through the data bus line DB, the address bus line AB, a chip designating signal line CSL4, and the R/W signal line R/WL. Sales data input from the input section 12 is stored in the RAM 30 as classified according to department, transaction or the like.

The CPU 28 has an X register of a capacity of 12 digits, one digit being 4 bits. The CPU 28 supplies the chip designating signals CS1 to CS4 to the respective control sections 14, 20, and 26 and the RAM 30 through the chip designating signal lines CSL1 to CSL4, respectively, for selecting the circuit to be used. The CPU 28 commonly supplies an R/W signal to the respective sections 14, 20 and 26 and the RAM 30 for exchange of data between the CPU 28 and the control sections 14, 20 and 26, and between the CPU 28 and the RAM 30.

A voice output circuit 32 is detachably connected to the address bus line AB, the data bus line DB, the chip designating signal line CSL3 and the R/W signal line R/WL. The voice output circuit 32 comprises a voice control section 34, a voice conversion section 36 connected to the voice control section 34, and a loudspeaker 38 connected to the voice conversion section 36.

The voice control section 34 has a voice buffer BB and writes the data input through the data bus line DB in the voice buffer BB. The voice control section 34 is connected to the voice conversion section 36 through bus lines B1, B2 and B3 for exchange of data therethrough.

The voice conversion section 36 converts the data supplied from the voice control section 34 into voice data to output it to the loudspeaker 38.

The loudspeaker 38 outputs a voice according to the voice data supplied from the voice conversion section 36.

Figure 2:
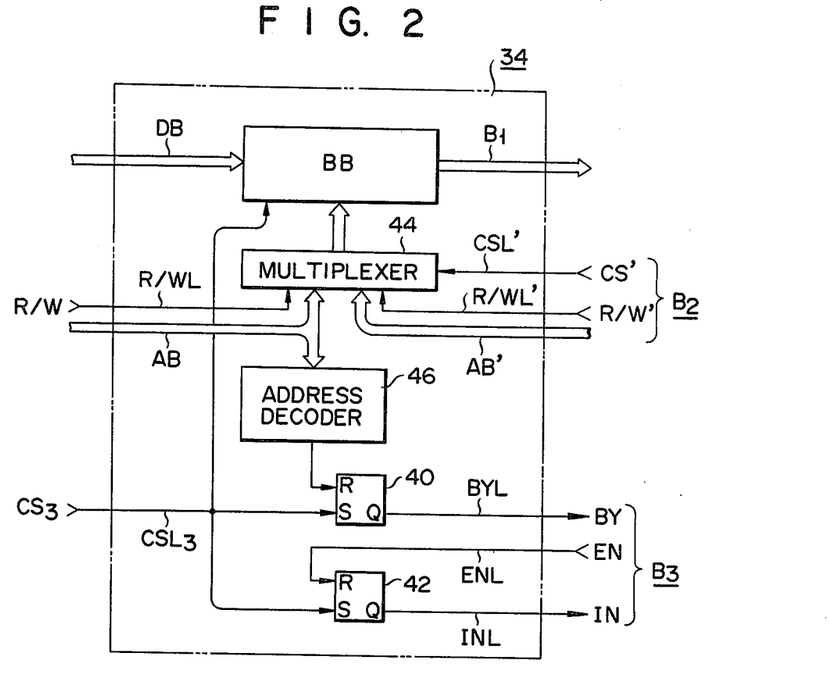
FIG. 2 is a block diagram schematically illustrating the construction of a voice control section shown in FIG. 1.

FIG. 2 is a block diagram schematically illustrating the construction of the voice control section 34. Flip-flops 40 and 42 have setting input terminals S which are connected to the chip designating signal line CSL3 and are supplied thereby with the chip designating signal CS3. The flip-flop 40 has a setting output terminal Q connected to a writing signal line BYL and outputs a writing signal BY through the signal line BYL. The flip-flop 42 has a setting output terminal Q connected to an input signal line INL and outputs an input signal IN through the signal line INL.

The flip-flop 42 also has a resetting input terminal R connected to an end signal line ENL and is reset by an end signal EN supplied through the end signal line ENL to interrupt the output of the input signal IN.

The voice buffer BB has a capacity of 12 digits, each digit being 4 bits. The voice buffer BB is connected to a multiplexer 44, the data bus line DB, the chip designating signal line CSL3, and the bus line B1. The data supplied through the data bus line DB are written in the voice buffer BB according to the address data, and the R/W signal supplied from the multiplexer 44. The voice buffer BB outputs the data written therein through the bus line B1 according to the address data of an address bus line AB' and a R/W' signal of a R/W' signal line R/WL' supplied from the multiplexer 44.

The multiplexer 44 is connected to the R/W signal line R/WL, the address bus line AB, a chip designating signal line CSL', the R/W' signal line R/WL', and the address bus line AB', and is supplied with a chip designating signal CS' through the chip designating signal line CSL' to switch the input status of the multiplexer 44. According to this switched status, the multiplexer 44 outputs to the voice buffer BB the R/W signal supplied through the R/W signal line R/WL and the address data supplied through the address bus line AB, or supplies to the voice buffer BB the R/W' signal supplied through the R/W' signal line R/WL' and the address data supplied through the address bus line AB'.

An input terminal of an address decoder 46 is connected to the bus line AB, and an output terminal thereof is connected to the resetting input terminal R of the flip-flop 40. When the address data is input through the address bus line AB and the address data indicating the 12th digit of the X register of the CPU 28 is detected, the address decoder 46 outputs a resetting signal to the resetting input terminal R of the flip-flop 40 to interrupt the output of the writing signal BY.

The chip designating signal line CSL', the R/W' signal line R/WL', and the address bus line AB' constitute the bus line B2. The writing signal line BYL, the end signal line ENL, and the input signal line INL constitute the bus line B3.

Figure 3:
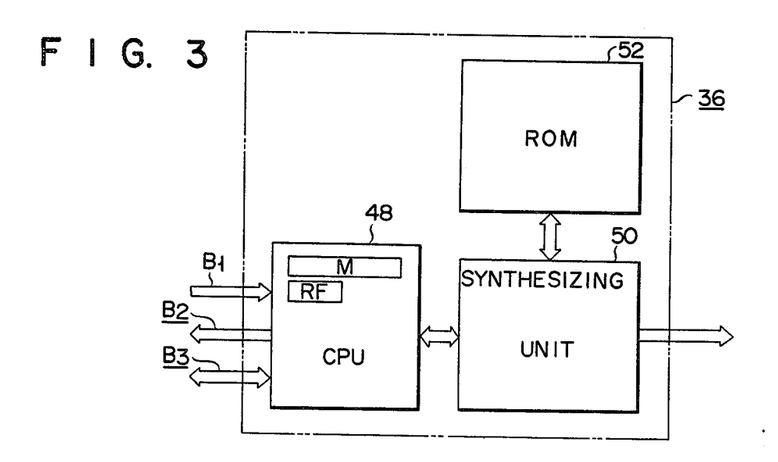
FIG. 3 is a block diagram schematically illustrating the construction of a voice conversion section shown in FIG. 1.

FIG. 3 is a block diagram schematically illustrating the construction of the voice conversion section 36. The voice conversion section 36 comprises a CPU 48, a synthesizing unit 50 connected to the CPU 48 and a ROM 52 connected to the synthesizing unit 50.

The CPU 48 is connected to the voice control section 34 through the bus lines B1, B2 and B3 for exchange of data therebetween. The CPU 48 also exchanges data with the synthesizing unit 50. The CPU 48 has a flag storing region RF of one bit and an M register having a capacity of 12 digits, one digit being 4 bits. The respective digits of the M register are designated, beginning with the smallest digit as M0, M1, . . . M11. Data read out from the voice buffer BB is written in the M register. "1" is written in the flag storing region RF when the registering for one customer is terminated.

Data obtained by analyzing the voice output from the loudspeaker 38 is stored in the ROM 52.

The synthesizing unit 50 comprises a D/A converter (not shown) and an interface section (not shown) interposed between the CPU 48 and the ROM 52. The synthesizing unit 50 reads out the data stored in the ROM 52 according to the data output from the CPU 48 at the interface section, and performs operations according to the read-out data to provide voice data. The voice data is converted to analog data by the D/A converter to be output to the loudspeaker 38.

The mode of operation of the embodiment of the construction described above will now be described. It is assumed that the voice output circuit 32 is connected to an electronic cash register of this embodiment. In digit X0 (the digit of the X register to which "0" is attached) of the X register of the CPU 28 is stored mode data representing the setting mode of the mode switches. The money data is stored in digits X1 to X8 (the digits of the X register to which "1" to "8" are attached). The guidance data representing the kind of stored money data (e.g., sub-total, total and so on) is stored in digit X9 (the digit of the X register to which "9" is attached). The input department data is stored in digits X10 and X11 (the digits of the X register to which "10" and "11" are attached).

Figure 4:
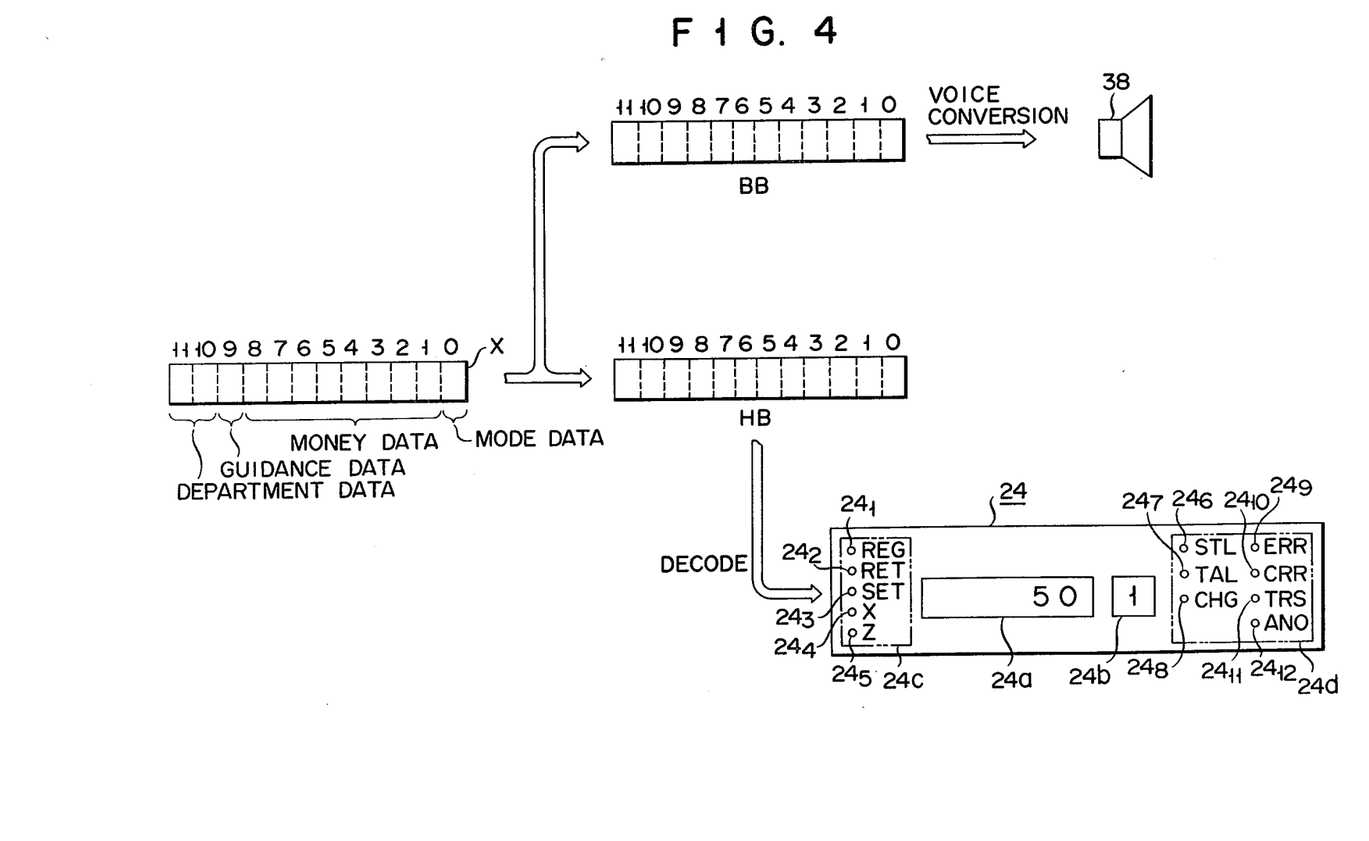
FIG. 4 is a view schematically illustrating the function of each digit of an X register of the CPU shown in FIG. 1, the flow of data in the X register, and the construction of the display section.

The display section 24 comprises a money display section 24a for displaying the money data with light emitting diodes (LEDs); a department display section 24b for displaying the department data with LEDs; a mode display section 24c having LEDs $24_1$ to $24_5$ at the heads of "REG", "RET", "SET", "X" and "Z" corresponding to the mode switches at the input section 12; and a guidance display section 24d having LEDs $24_6$ to $24_{12}$ at the heads of "SUB-TOTAL (STL)", "TOTAL (TAL)", "CHANGE (CHG)", "ERROR (ERR)", "CORRECTION (CRR)", "TRANSFER (TRS)", and "ARTICLE NUMBER (ANO)" corresponding to the sub-total key, the total key and so on of the input section 12.

When the display program is executed at the CPU 28 under this condition, the data stored in the X register of the CPU 28 is supplied to the display buffer HB of the display control section 26. The chip designating signal CS3 supplied from the CPU 28 to the display control section 26 is also supplied to the voice control section 34. The data stored in the X register is also written in the voice buffer BB.

The data supplied to the display buffer HB is decoded by the display control section 26 and is thereafter displayed at the display section 24 as shown in FIG. 4. Thus, the money data is displayed at the money display section 24a of the display section 24, the department data is displayed at the department display section 24b, the mode data is displayed at the mode display section 24c, and the guidance data is displayed at the guidance display section 24d, respectively, with LEDs.

The data written by the voice buffer BB is converted into voice data by the voice conversion section 36 and is then supplied to the loudspeaker 38. Consequently, a voice is output from the loudspeaker 38.

Figure 5:
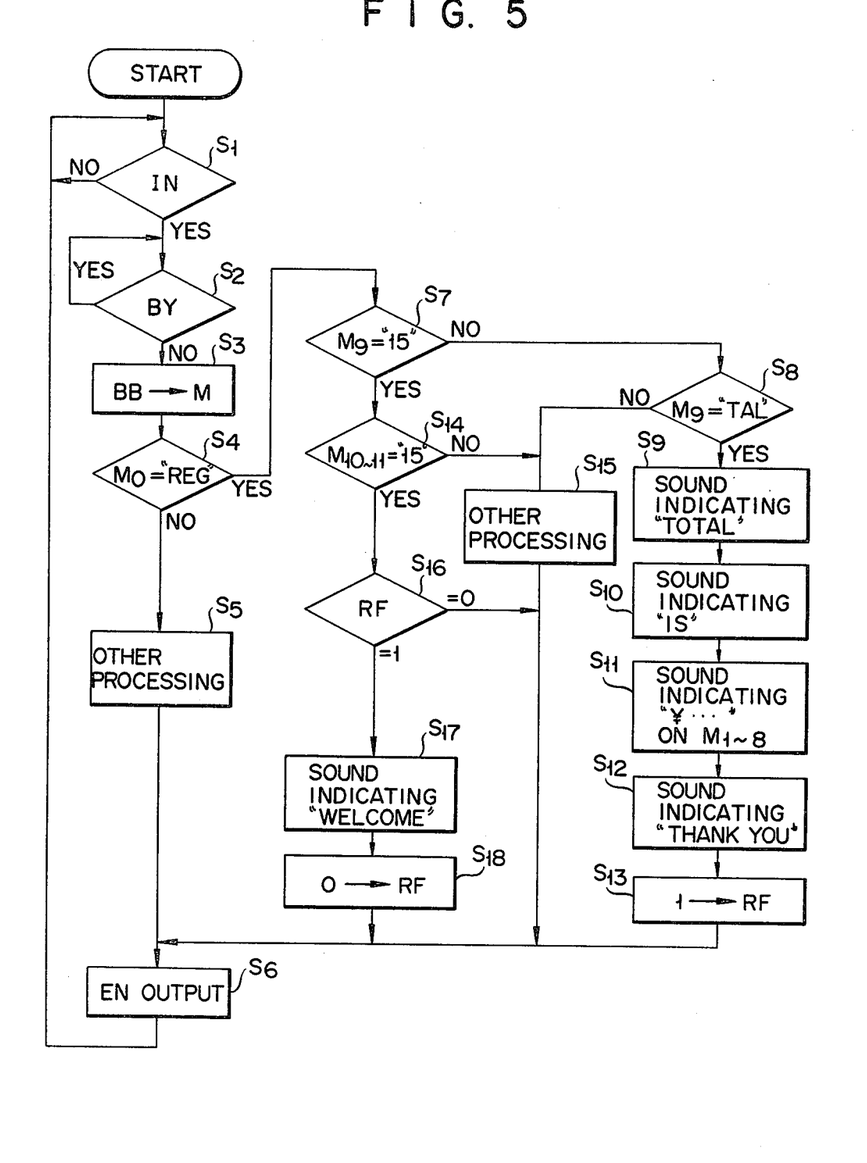
FIG. 5 is a flow chart showing each step of the voice output operation of this embodiment.

The voice output operation of the voice conversion section 36 of the voice output circuit 32 is performed according to the flow chart shown in FIG. 5.

In the execution of step S1, a judgment is made as to whether or not the input signal IN is output from the voice control section 34. When a judgment is made that the input signal IN is not output, further execution is suspended until a judgment is made that the input signal IN is output. When the input signal IN is judged to have been output, the program proceeds to step S2.

In the execution of step S2, a judgment is made as to whether or not the writing signal BY is output from the voice control section 34. When a judgment is made that the writing signal BY is output, further execution is suspended until the writing of the data into the voice buffer BB of the voice control section 34 is terminated. When a judgment is made that the writing signal BY is not output, the program proceeds to step S3.

In the execution of step S3, the chip designating signal CS' is supplied from the CPU 48 to the multiplexer 44 for switching the input status of the multiplexer 44. Thereafter, the data stored in the voice buffer BB is written in the M register of the CPU 48. The program then advances to step S4.

In the execution of step S4, a judgment is made as to whether or not the data stored in the digit M0 of the M register of the CPU 48 is in "REG" mode. That is, a judgment is made as to whether or not the mode switch of the input section 12 is set in the registering mode. When a judgment is made that the data stored in the digit M0 is data other than the "REG" mode, the program advances to the next step S5.

In the execution of step S5, the other processing is performed according to the mode data of the digit M0, and the program advances to step S6.

In the execution of step S6, the end signal EN is output from the CPU 48. This end signal EN resets the flip-flop 42 of the voice control section 34 to interrupt the output of the input signal IN. The program then returns to step S1 and further execution is suspended until the input signal IN is provided, that is, until the next key is operated.

When the data stored in the digit M0 of the M register is judged to be the "REG" mode in the execution of step S4, the program advances to the next step S7.

In the execution of step S7, a judgment is made as to whether or not a blanking code "15" is stored in the digit M9 of the M register, that is, whether or not the guidance data is stored in the digit M9. The blanking code may be a code other than "15", for example, "13". When the guidance data is stored in the digit M9, the program advances to step S8.

In the execution of step S8, a judgment is made as to whether or not the guidance data stored in the digit M9 is the data related to the total (TOTAL), that is, whether or not the registering for one customer has been finished and the CASH/MONEY RECEIVED KEY is operated. When a judgment is made that the CASH/MONEY RECEIVED KEY is operated, the program advances to the next step S9.

In the execution of step S9, the signal representing "TOTAL" is supplied to the synthesizing unit 50 which reads out the desired voice data from the ROM 52, to obtain the analog voice data corresponding to "TOTAL" and to output it to the loudspeaker 38. The loudspeaker 38 outputs the voice "TOTAL" according to the analog voice data. The program then advances to step S10.

In the execution of step S10, the signal representing "IS" is supplied to the synthesizing unit 50 which reads out the voice data from the ROM 52 according to this signal and obtains the analog signal corresponding to "IS" to supply it to the loudspeaker 38. Consequently, the loudspeaker 38 outputs the voice "IS". The program then advances to step S11.

In the execution of step S11, the money data stored in the digits M1 to M8 of the M register is supplied to the synthesizing unit 50. Then, the synthesizing unit 50 reads out the required voice data from the ROM 52 according to the money data and obtains the analog voice data corresponding to the money data "¥ . . ." to output it to the loudspeaker 38. The loudspeaker 38 outputs the voice "¥ . . ." according to the analog voice data. The program then advances to step S12.

In the execution of step S12, the signal representing "THANK YOU" is supplied to the synthesizing unit 50 which reads out the voice data from the ROM 52 according to the above-mentioned signal and obtains the analog signal corresponding to "THANK YOU" to output it to the loudspeaker 38. The program then advances to step S13.

In the execution of step S13, "1" is written in the flag storing region RF of the CPU 48. This processing is performed to indicate that the registering for one customer has been terminated. The program then returns to step S6.

In the execution of step S7, when the blanking code "15" is judged to be written in the digit M9 of the M register, that is, when a key for providing guidance data, for example, the CASH/MONEY RECEIVED KEY or the SUB-TOTAL KEY, is operated, the program advances to step S14.

In the execution of step S14, a judgment is made as to whether or not the blanking code "15" is written in the digits M10 and M11 of the M register, that is, whether or not department data is written in the digits M10 and M11. When a judgment is made that department data is stored, that is, that the department key is operated, the program advances to step S15.

In the execution of step S15, other processings such as the registering processing for each department are performed.

When guidance data other than "TOTAL" is stored in the digit M9 of the M register in the execution of step S8, the program advances to step S15. In step S15, other processings are executed according to the guidance data of the digit M9 in step S15.

The program returns to step S6 after completing step S15.

When it is judged that the blanking code "15" is written in the digits M10 and M11 of the M register in the execution of step S14, that is, when the numerical keys of the input section 12 are operated, the program advances to step S16.

In the execution of step S16, a judgment is made as to whether the data written in the flag storing region RF of the CPU 48 is "0" or "1". When a judgment is made that "1" is stored in the above-mentioned region RF, that is, when the registering for one customer is terminated in the execution of step S13 and the money data on the purchased articles for a next customer is registered by the money keys, the program advances to step S17.

In the execution of step S17, the signal representing "WELCOME" is supplied to the synthesizing unit 50 which reads out the voice data from the ROM 52 according to the above-mentioned signal and obtains an analog signal corresponding to "WELCOME" to supply it to the loudspeaker 38. Consequently, the loudspeaker 38 outputs a voice "WELCOME". The program then advances to step S18.

In the execution of step S18, "0" is written in the flag storing region RF of the CPU 48. The content of the storing region RF remains "0" until "1" is written by the execution of step S13. Therefore, it is only with the case of the first registered number at the starting time of the registering operation that the content of the flag storing region RF is judged to be "1" in step S16.

When "0" is stored in the flag storing region RF in the execution of step S16, the program returns to step S6. The program also returns to step S6 after executing step S18.

FIGS. 6A to 6D show the operations of the keys of the input section 12, the displays at the display section 24 at these times, and the voices output from the loudspeaker 38. It is assumed that the mode switch of the input section 12 is set to the "REG" mode.

Figure 6A:
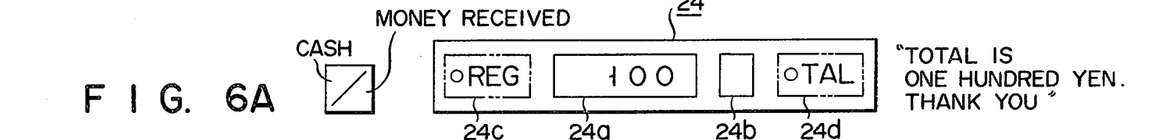
FIGS. 6A to 6D are views showing particular key operations of this embodiment, schematic displays corresponding to the key operations at the display section, and the voices output from the voice output circuit which correspond to these displays at the display section.

When the CASH/MONEY RECEIVED KEY of the input section 12 is operated first as shown in FIG. 6A, the total money, for example, "100", is displayed at the money display section 24a, and the LED of "REG" of the mode display section 24c and the LED of "TAL" of the guidance display section 24d are lit. Simultaneously, with these display operations, steps S1 to S4 and steps S7 to S12 shown in FIG. 5 are sequentially executed. As a result, the voice "TOTAL IS ONE HUNDRED YEN. THANK YOU." is output from the loudspeaker 38.

The registering for one customer is thus terminated. Further, as shown in FIG. 5, step S13 is executed and "1" is written in the flag storing region RF of the CPU 48.

Figure 6B:
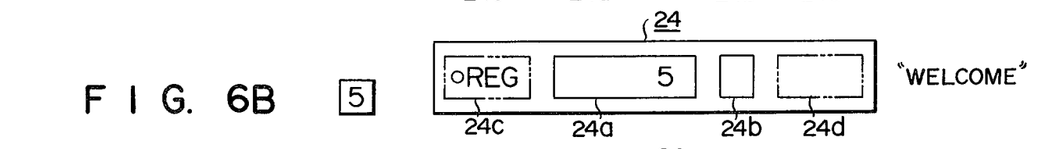

Registering for the next customer is then initiated. When the money key $\boxed{5}$ is operated, as shown in FIG. 6B, for inputting money data (e.g., 50 YEN), the money data "5" which is the first registered number is displayed at the money display section 24a, and the LED of "REG" of the mode display section 24c is lit. Simultaneously, with these display operations, steps S1 to S4, S7, S14, S16, and S17 are sequentially executed. Consequently, the voice "WELCOME" is output from the loudspeaker 38. Thereafter, in step S18, "0" is written in the flag storing region RF.

Figure 6C:
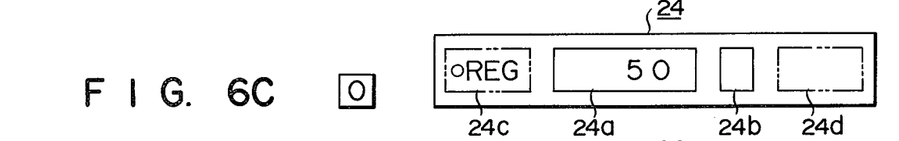

As shown in FIG. 6c, when the money key $\boxed{0}$ is operated, the previous money data "5" and the current money data "0" are displayed at the money display section 24a to display the complete money data "50". The LED of "REG" of the mode display section 24c is also lit. Since "0" is written in the flag storing region RF at the time when the money key $\boxed{0}$ is operated, steps S16 and S6 of FIG. 5 are executed so that no voice is output.

Figure 6D:
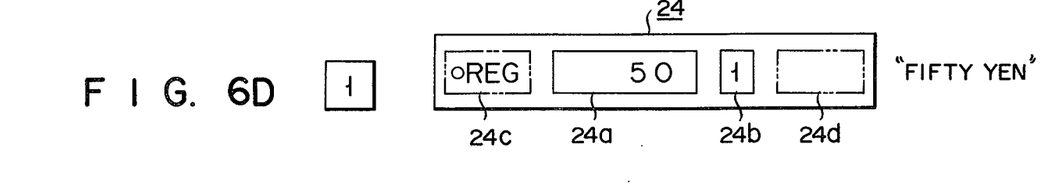

When the department key $\boxed{1}$ at the input section 12 is operated as shown in FIG. 6D, "50" is displayed at the money display section 24a, "1" is displayed at the department display section 24b, and the LED for "REG" of the mode display section 24c is lit. Simultaneously, with these display operations, steps S14 and S15 are executed, and the input money data "FIFTY YEN" is output from the loudspeaker 38.

In the above embodiment, the voice output circuit 32 is detachably connected to the address bus line AB, the data bus line DB, the chip designating signal line CSL3, and the R/W signal line R/WL. However, the voice output circuit may be fixed to the bus lines AB and DB and the lines CSL3 and R/WL.

Although the above embodiment was applied to an electronic cash register, the present invention is also applicable to an electronic computer having a voice output function.

Although the greeting "WELCOME" is offered to the customer in the above embodiment, voices other than this greeting may be offered as required.

Although the first registered number at the start of the registering was judged by the CPU 48 of the voice conversion section 36 in the above embodiment, it may alternatively be judged by the CPU 28.

It is to be understood that various modifications may be made without departing from the spirit and scope of the present invention.

What is claimed is:

1. A voice data output apparatus for an electronic cash register comprising:
   input means having at least numerical keys for inputting numerical data and transaction keys, at least one of said transaction keys generating input signals designating the completion of a registering operation for one client;

control means coupled to said input means for performing predetermined operations according to said input signals from said transaction keys and for supplying numerical data input by the operation of said numerical keys;

visual information output means coupled to said control means for outputting visual information corresponding to said numerical data supplied from said control means;

means responsive to operation of said at least one transaction key for storing flag data for indicating whether or not the registration of sales data is completed for one client after the operation of said at least one transaction key; and voice output means coupled to said control means for outputting a numerical voice signal according to said numerical data supplied from said control means and responsive to the stored flag data for outputting an audible greeting voice when said flag data indicates that said registration has been completed for one client and when one of said numerical keys is operated to input the first digit of a series of numerical data which is to be input by the operation of said numerical keys.

2. A voice data output apparatus according to claim 1, wherein said voice output means comprises voice control means coupled to said control means and which has a voice buffer to store numerical data supplied from said control means, voice conversion means coupled to said voice control means for obtaining voice data according to numerical data supplied from said control means and according to predetermined message data supplied when the first registered number is input after the operation of a transaction key, and a loudspeaker coupled to said voice conversion means for outputting a voice according to a signal from said conversion means.

3. A voice data output appartus according to claim 2, wherein said voice conversion means comprises a CPU having at least a first register coupled to said voice control means through bus lines for storing numerical data from said voice control means said CPU including means for judging the flag data of said means for storing flag data and for supplying predetermined message data when there is said flag data and the numerical data is a first register number; a synthesizing unit coupled to said CPU for obtaining voice data according to said numerical data and message data supplied from said CPU; and a ROM connected to said synthesizing unit for storing a preanalyzed voice to be output from said loudspeaker and for supplying voice data corresponding to the voice data of said synthesizing unit.

4. A voice data output apparatus according to claim 1, wherein said visual information output means comprises printing means coupled to said control means for outputting printing information coressponding to said numerical data supplied from said control means; and display means coupled to said control means for performing a visual display corresponding to said numerical data supplied from said control means.

* * * * *